United States Patent [19]

Neff

[11] 4,197,874

[45] Apr. 15, 1980

[54] PRESSURE REGULATOR AND FLOW CONTROL VALVE WITH PRE-EXHAUST VENT MEANS

[75] Inventor: James A. Neff, Bloomfield Township, Oakland County, Mich.

[73] Assignee: MAC Valves, Inc., Wixom, Mich.

[21] Appl. No.: 938,514

[22] Filed: Aug. 31, 1978

[51] Int. Cl.$^2$ .................... F15B 11/04; F15B 13/042; F16K 17/18

[52] U.S. Cl. ...................................... 137/270; 91/443; 137/505.18; 137/599

[58] Field of Search .................. 91/443, 447; 137/270, 137/505.18, 599

[56] References Cited

U.S. PATENT DOCUMENTS

| | | |
|---|---|---|
| Re. 29,292 | 7/1977 | Tennis . |
| 598,579 | 2/1898 | Shields . |
| 840,876 | 1/1907 | Steedman . |
| 941,153 | 11/1909 | Krichbaum . |
| 1,210,891 | 2/1917 | Blanchard . |
| 2,141,715 | 12/1938 | Hilger . |
| 2,285,049 | 6/1942 | Parks . |
| 2,495,785 | 1/1950 | Stephens . |
| 2,499,262 | 2/1950 | Stoudt . |
| 2,501,483 | 3/1950 | Taylor . |
| 2,570,937 | 10/1951 | Gash . |
| 2,881,793 | 4/1959 | Lee . |
| 3,186,307 | 6/1965 | Ellenbogen . |
| 3,213,886 | 10/1965 | Pearne . |
| 3,376,792 | 4/1968 | Clarke . |
| 3,400,735 | 9/1968 | Favors . |
| 3,621,867 | 11/1971 | Johnson . |
| 3,951,162 | 4/1976 | Wilke . |

FOREIGN PATENT DOCUMENTS

| | | |
|---|---|---|
| 5704 | 6/1901 | Fed. Rep. of Germany . |
| 1922073 | 11/1970 | Fed. Rep. of Germany . |
| 1224196 | 2/1960 | France . |
| 1431562 | 4/1976 | United Kingdom . |

*Primary Examiner*—Robert G. Nilson
*Attorney, Agent, or Firm*—Robert G. Mentag

[57] ABSTRACT

A combination pressure regulating and flow control valve having a first fluid passage interconnecting an upstream port and a downstream port. An adjustable pressure regulating valve is mounted in the first fluid passage to provide a reduced pressure at the downstream port. An adjustable flow control valve is mounted in said first fluid passage for selective provision of either a meter in or meter out action on fluid flowing through said first fluid passage. In parallel with said flow control valve is a spring biased check valve for selective provision of free flow in a direction opposite to the metering action of the flow control valve. A parallel second fluid passage in the valve interconnects the upstream port with the downstream port. Mounted in the second fluid passage is an adjustable, spring loaded pre-exhaust valve which is vented to the upstream port. When a meter out flow takes place from the downstream port through said first fluid passage to the upstream port the pre-exhaust valve is set to allow flow through the parallel second fluid passage until a pre-set pressure at the downstream port is reached and then it closes against flow.

8 Claims, 11 Drawing Figures

PRESSURE REGULATOR AND FLOW CONTROL VALVE WITH PRE-EXHAUST VENT MEANS

BACKGROUND OF THE INVENTION

1. Field of the Invention

This invention relates generally to the valve art, and more particularly to an improved valve which combines the functions of pressure regulating and fluid flow control. The combination pressure regulating and flow control valve of the present invention is adapted for many uses as, for example, for controlling the operation of an air cylinder in either one direction or both directions.

2. Description of the Prior Art

It is known in the valve art to provide pressure regulation to individual or multiple directional flow control valves, with single or multiple pressure regulators, to control the pressure supplied to a device being controlled. The use of multiple pressure regulators is expensive and awkward, requiring special directional flow control valves and excessive piping. Where multiple directional flow control valves are mounted in stacking fashion, or on a common manifold base, it is extremely difficult and expensive to provide pressure regulating to individual outlets. It is not common to use such pressure regulators in the line between the outlet or cylinder port of a directional flow control valve and the device being controlled because of cost, space, and the relatively short life of diaphragms and other components of pressure regulators. It is common to provide flow control means in the line between a directional flow control valve and the device being controlled. Because of cost, complexity and space requirements, it has not been practicable in the past to provide both pressure regulator means and flow control means between a cylinder port of a directional flow control valve and a device being controlled. The result has been a waste of air, requiring excessive pumping capacity, a waste of energy, and an increase in the cost of using air as a control and power means.

SUMMARY OF THE INVENTION

In accordance with the present invention, a combination pressure regulating and flow control valve is provided which can be installed in any cylinder or actuation line to control both the pressure and the flow of air in that line. The combination valve of the present invention includes an adjustable pressure regulator valve means which is constructed and arranged to regulate the supply pressure to an apparatus being controlled by the valve of the present invention, as for example, an air cylinder.

The valve of the present invention also includes an adjustable flow control valve for controlling the flow of air to or from the air cylinder being controlled by the valve so as to control the return speed of the air cylinder. The adjustable flow control valve means is used in series with the adjustable pressure regulator valve means in a first fluid flow passage to provide either a meter in or a meter out fluid flow, with pressure regulation and flow control, and with a free flow out or a free flow in fluid flow, respectively.

A check valve means is mounted in the first fluid flow passage in parallel with the adjustable fluid flow control valve means, for providing a free flow of fluid in a direction opposite to the metering action of the flow control valve means. The last mentioned check valve means is made as a reversible valve, so that in one position it provides a free flow "out" action to fluid flowing in one direction, and when reversed to a second position, it provides a free flow "in" action to fluid flowing in the other direction.

The combination pressure regulating and flow control valve is also provided with an adjustable quick pre-exhaust valve means for operation with a meter out fluid flow, quickly reducing the downstream volume of fluid through a second parallel fluid flow passage to the upstream port. The quick pre-exhaust valve means is vented to the upstream port, and it can be set to allow no flow of fluid from the downstream port to the upstream port or to allow a pre-determined volume of fluid flow until a preset pressure at the downstream port is reached, and then to close against further flow. The venting of the pre-exhaust valve means minimizes any pressure differential thereon, and provides for a quick and smooth operation of the pre-exhaust valve means. During a meter in operation, the pre-exhaust valve means only acts as a check valve.

The combined pressure regulating and flow control valve of the present invention overcomes the disadvantages of the aforementioned prior art structures in that no separate pressure regulating device is required to reduce the pressure down to a required constant lower operating pressure, whereby a saving of air is provided at a minimum of cost. The pressure regulating and flow control valve of the present invention also provides a control over the speed of an air cylinder, whereby an air cylinder may be efficiently operated in either direction, and at a savings of air. The valve of the present invention is advantageous in that it provides in one compact and economical unit the combined functions of pressure regulating and flow control.

The combination pressure regulating and flow control valve of the present invention also includes a quick pre-exhaust function which provides a quick dump exhaust characteristic with a meter out fluid flow, in addition to the pressure regulating and flow control characteristics.

Other features and advantages of this invention will be apparent from the following detailed description, appended claims, and the accompanying drawings.

DESCRIPTION OF THE PREFERRED EMBODIMENTS

Figure 1:
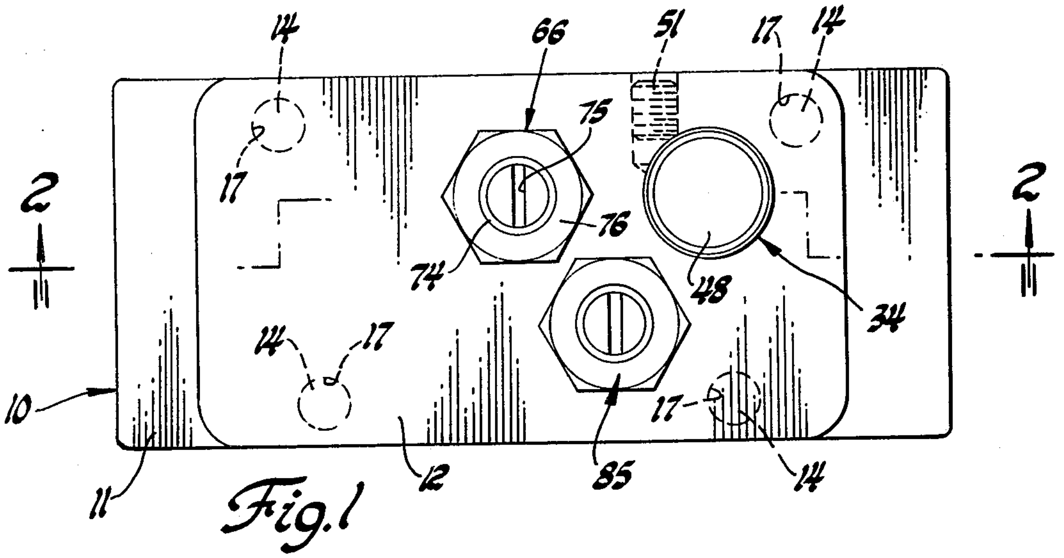
FIG. 1 is a top plan view of a valce made in accordance with the principles of the present invention.
Figure 2:
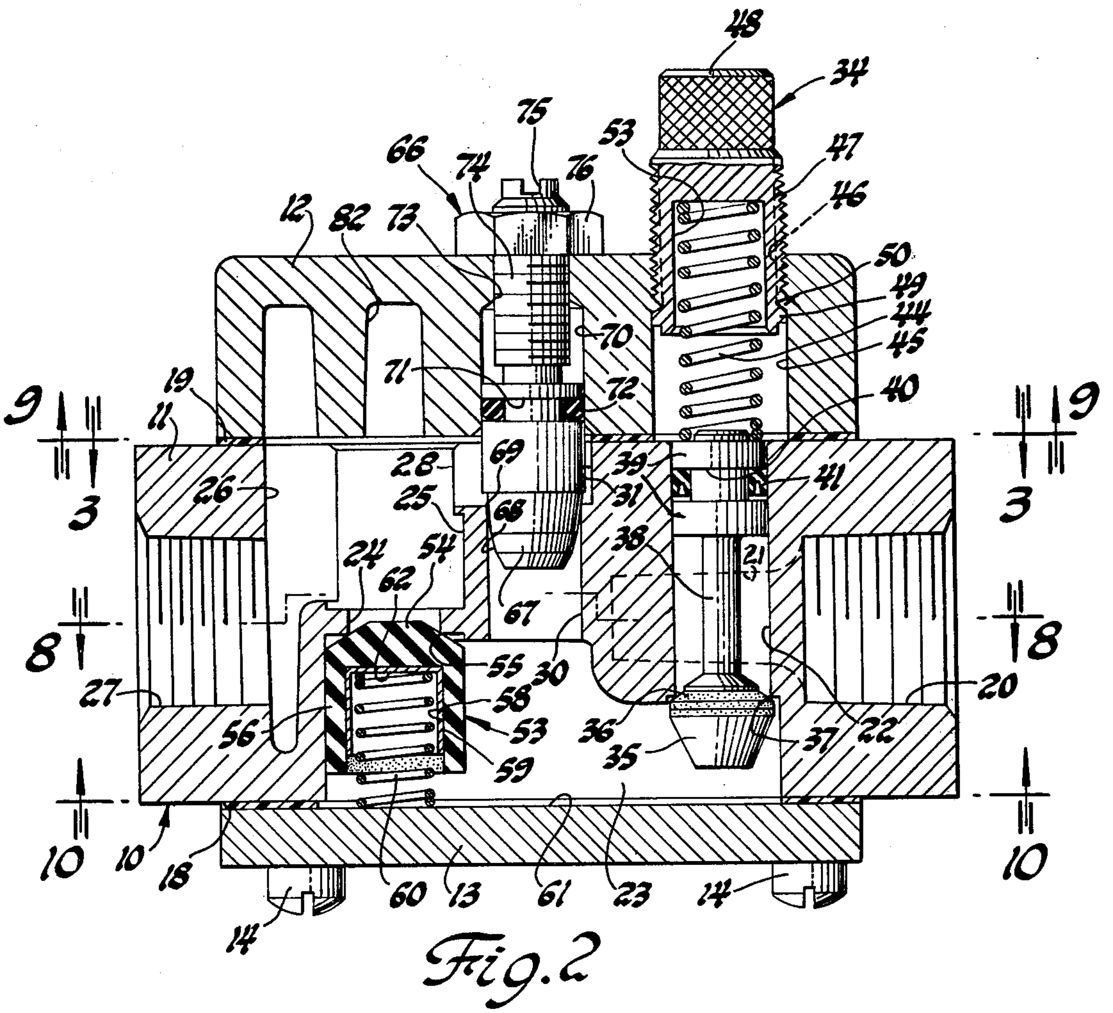
FIG. 2 is an elevation section view of the valve structure illustrated in FIG. 1, taken along the line 2—2 thereof, and looking in the direction of the arrows.
Figure 4:
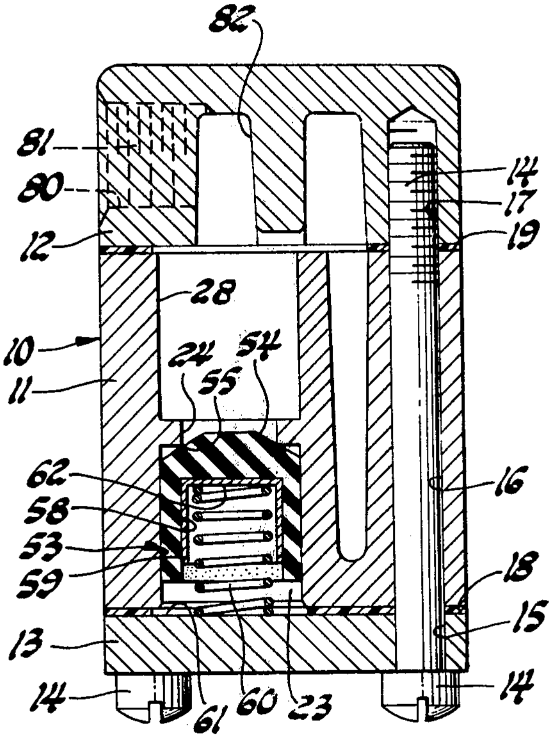
FIG. 4 is a vertical section view of the valve structure illustrated in FIG. 3, taken along the line 4—4 thereof, and looking in the direction of the arrows.

Referring now to the drawings, and in particular to FIGS. 1 and 2, the numeral 10 generally designates a first illustrative embodiment of a pressure regulator and flow control valve made in accordance with the principles of the present invention. The valve 10 includes a valve body 11, a top end cover 12, and a bottom end cover 13 (FIG. 2). A suitable gasket 18 is disposed between the bottom end cover 13 and the valve body 11. A suitable gasket 19 is also disposed between the top end cover 12 and the valve body 11. The end covers 12 and 13 are secured to the valve body 11 by any suitable means, as by a plurality of suitable machine screws 14. As shown in FIG. 4, each of the machine screws 14 extends upwardly through a suitable bore 15, formed through the bottom end cover 13, and up through a bore 16 formed through the valve body 11, and into threaded engagement with a threaded bore 17 formed in the top end cover 12.

Figure 8:
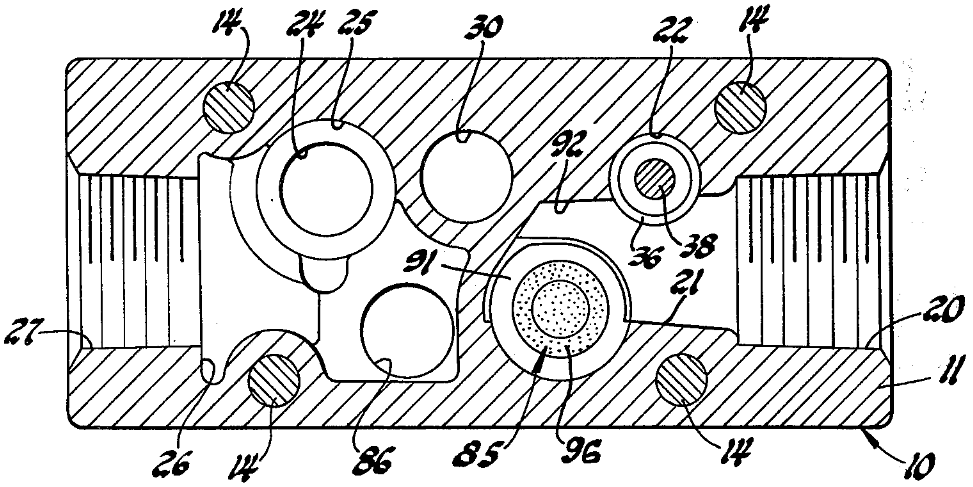
FIG. 8 is a horizontal section view of the valve structure illustrated in FIG. 2, taken along the line 8—8 thereof, and looking in the direction of the arrows.

The valve body 11 is provided with a threaded supply or upstream port 20 (FIG. 2) which is adapted to be connected, by any suitable conduit means, to a suitable source of pressurized air or other fluid. As shown in FIG. 8, the upstream port 20 communicates with a first upper interior passageway 21 which is formed in the upper portion of the valve body 11. A bore or passageway 22 is formed through the valve body 11 in a position transverse to the upstream port 20 for communicating the upper interior passageway 21 with a lower interior passageway 23 (FIG. 2). As shown in FIG. 2, the lower interior passageway 23 is formed in the lower end of the valve body 11, and it is enclosed on its lower end by the bottom end cover 13.

As shown in FIG. 2, the lower interior passageway 23 communicates with a second upper interior passageway 26 through a bore 24 and a passageway 25. As shown in FIGS. 2 and 8, the upper interior passageway 26 communicates with a threaded outlet or downstream port 27. As shown in FIG. 2, the lower interior passageway 23 also communicates with the upper end of the second upper interior passageway 26 through the bore 30, the passageway 31, and the bore 28. The bore 28 communicates at its lower end with the passageway 25.

As shown in FIG. 2, a pressure regulator valve, generally indicated by the numeral 34, is operatively mounted in the vertical bore 22 for controlling the flow of fluid between the first upper interior passageway 21 and the lower interior passageway 23. The adjustable pressure regulator valve 34 includes a one piece poppet valve element 35 which is bonded to the lower end of a valve stem 38. The valve element 35 terminates at its upper end with a conical shoulder 36 which is adapted to seat on the orifice or valve seat 37 which is formed at the lower end of the bore 22 where the bore 22 communicates with the lower, interior passageway 23. The valve stem 38 is provided at its upper end with a pair of spaced apart, integral, annular shoulders or flanges 39 which form therebetween a groove 40 in which is mounted a suitable balancing seal means 41.

The valve bore 22 communicates at its upper end with a bore 45 formed through the top end cover 12. The bore 45 has an outer threaded end 46. A spring 44 is mounted in the unthreaded inner end of the bore 45, and the inner end thereof is seated against the upper end of the outermost flange 53 which is formed in the inner end of a pressure adjusting valve stem 48. The pressure adjusting valve stem 48 is provided with a threaded outer surface 47 which is threadably mounted in the outer threaded end 46 of the bore 45. A stop member 49 is formed on the inner end of the outer stem threaded member 48, and in its outermost position, the stop member 49 engages a corresponding stop member 50 at the inner end of the threaded bore portion 46. The pressure regulating valve 34 is shown in the position with the pressure on the spring 44 at a no-load position. In use, the upper stem threaded portion 48 is threaded inwardly to exert a pressure on the spring 44, which in turn normally maintains the valve element 35 in an open position to allow flow past the valve element 35 until a predetermined back pressure builds up in the lower interior passageway 23 to provide an unbalanced differential pressure which closes the valve element 35. As shown in FIG. 1, a suitable plastic set screw 51 is mounted in the top end cover 12 for operative engagement with the valve stem portion 48 for holding it in an adjusted position. In the closed position, the force of the inlet fluid pressure in the upper interior passageway 21 is balanced between the inlet seat 37 and the pressure balancing seal means 41. Accordingly, variations in inlet or upstream or pressure can cause only small variations in the downstream pressure.

As shown in FIG. 2, the lower interior passageway 23 communicates with the upper interior passageway 26 through the bore 24 and the passageway 25. The lower end of the bore 24 is provided with an orifice or valve seat 55 on which is normally seated a check valve means, generally indicated by the numeral 53. The check valve means 53 is provided with a cup-shaped valve body 56 which has an open lower end, and a closed upper conical end 54 which is seated on the valve seat 55. The valve body 56 is made from any suitable elastomeric material, and it is provided with a cup-shaped liner 59 which is seated in the check valve body bore 58. The liner 59 may be made from any suitable material, as for example, stainless steel. A suitable spring 60 has its upper end mounted within the cup-shaped liner 59 and against the closed inner end 62. The lower end of the spring 60 is extended downwardly and seated against the inner face 61 of the bottom end cover 13.

It will be seen that the spring 60 normally maintains the check valve means 53 in the closed position shown in FIG. 2 to prevent flow of air or other fluid from the lower interior passageway 23 upwardly into the upper interior passageway 26, except flow past the hereafter described flow control means 66. When fluid is flowing through the valve 10 from the upstream port 20 to the downstream port 27. However, when the flow of fluid through the valve 10 is in the reverse direction, that is from the upper interior passageway 26 downwardly into the lower interior passageway 23, then the check valve means 53 would be biased downwardly by the returning fluid flow pressure and moved to an open position to permit the fluid to exhaust through the bore 24 and into the lower interior passageway 23 and then upwardly through the bore 22 and into the upper interior passageway 21 and out the upstream port 20.

Figure 5:
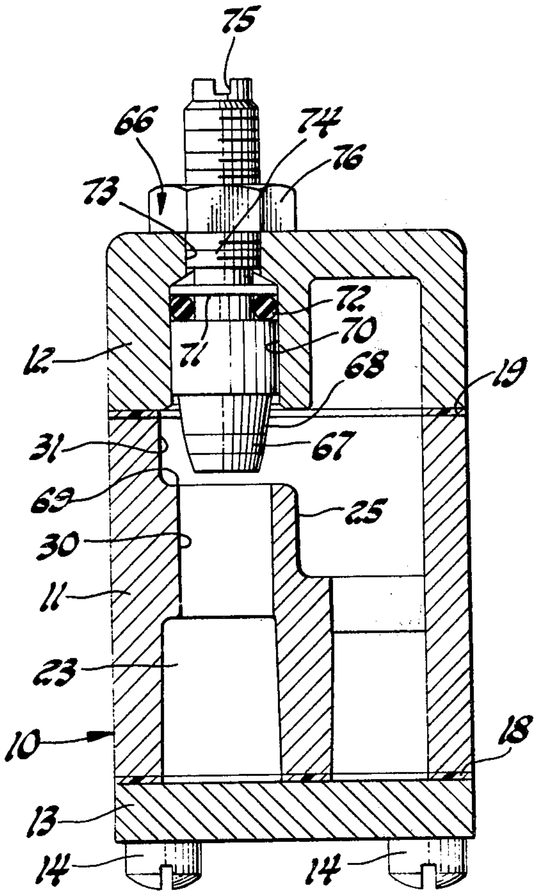
FIG. 5 is a vertical section view of the valve structure illustrated in FIG. 3, taken along the line 5—5 thereof, and looking in the direction of the arrows.

As shown in FIG. 2, an adjustable fluid flow control means, generally indicated by the numeral 66, is vertically disposed in the valve body 11 at right angles to the upstream and downstream ports 20 and 27, respectively. The fluid flow control means 66 includes a threaded valve stem 74 which has integrally formed on the lower end thereof a conically shaped valve 67, which may be termed a needle valve. The tapered surface 68 on the nose of the valve 67 is adapted to be operatively disposed in the bore 30, and it is adapted to be seated on a valve seat 69 which is formed at the upper end of the bore 30. A bore 70 is formed in the top end cover 12 in alignment with the bore 30 in the valve body 11 for the sliding reception of the upper end of the valve 67. A groove 71 is formed around the upper end of the valve 67 and has operatively mounted therein a suitable O-ring seal means 72 for sealing engagement with the bore 70. The threaded valve stem 74 is threadably mounted in a threaded bore 73 formed in the top end cover 12 in alignment with the larger bore 70. The outer end of the valve stem 74 extends outwardly of the top end cover 12 and is provided with a slot 75 for adjusting the valve stem 74. A suitable jam nut 76 is threadably mounted around the outer upper end of the valve stem 74 for locking said valve stem in an adjusted position. The flow control valve 66 is shown in a closed position, but it will be understood that in operation, the valve stem 74 will be adjusted upwardly to an open position to allow a predetermined controlled flow of fluid past the needle valve 67. FIG. 5 shows the needle valve 67 in a fully retracted position to allow free fluid flow past the valve element 67.

As shown in FIGS. 2 and 4, the bore 28 in the upper end of the valve body 11 communicates with a passage 82 formed in the top end of cover 12. A threaded bore 80 communicates with the passage 82 to provide a gage port for operatively mounting a pressure gage to check the pressure in the upper interior passageway 26, if desired. As shown in FIG. 4, the gage port 80 is enclosed by a suitable threaded plug 81.

In use, the valve stem 74 may be adjusted upwardly from the position shown in FIG. 2 to permit fluid flow through the passageway 30 at a selected controlled rate. It will be seen, that when fluid is flowing from the lower interior passageway 23 upwardly through the passage 30 and past the needle valve 67 and into the upper interior passageway portion 31, that the fluid will be subjected to a meter in action because the check valve means 53 prevents flow into the upper interior passageway 26.

Figure 3:
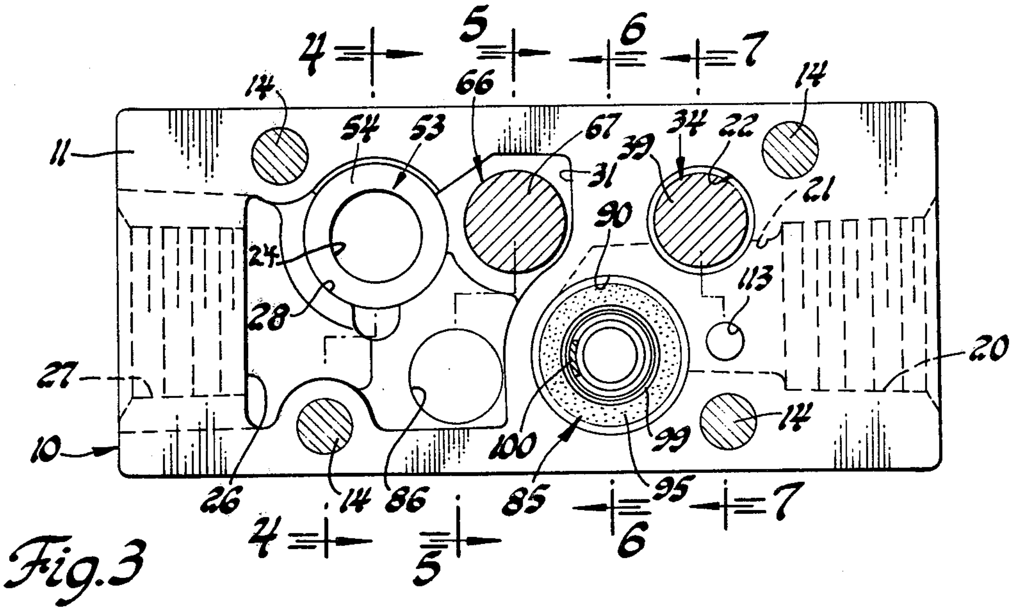
FIG. 3 is a horizontal section view of the valve structure illustrated in FIG. 2, taken along the line 3—3 thereof, looking in the direction of the arrows, and with the top cover removed.
Figure 6:
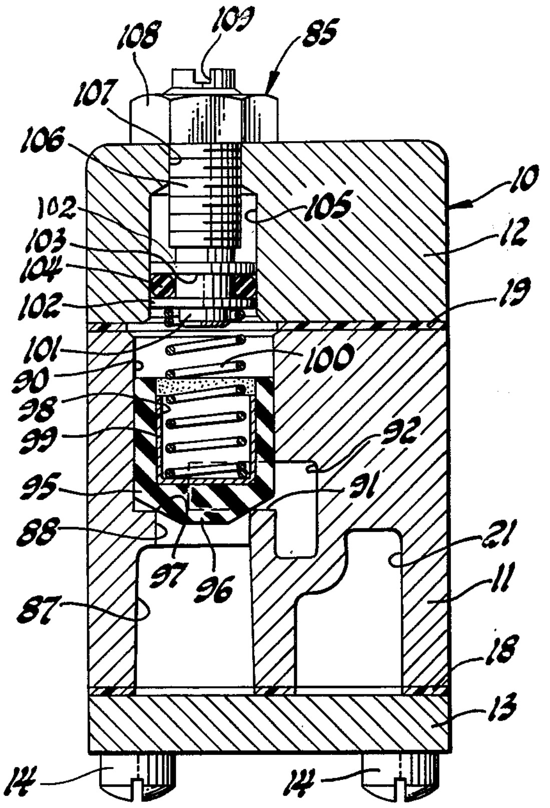
FIG. 6 is a vertical section view of the valve structure illustrated in FIG. 3, taken along the line 6—6 thereof, and looking in the direction of the arrows.
Figure 10:
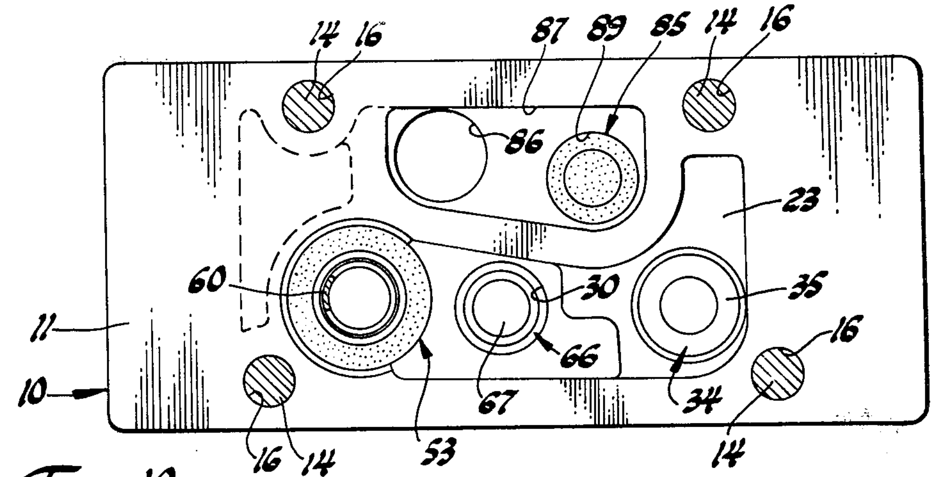
FIG. 10 is a horizontal section view of the valve structure illustrated in FIG. 2, taken along the line 10—10 thereof, looking in the direction of the arrows, and with the bottom cover removed.

As shown in FIGS. 1, 6 and 10, the valve 10 is further provided with a pre-exhaust valve means, generally indicated by the numeral 85. As shown in FIG. 6, the pre-exhaust valve means 85 includes a cup-shaped valve body 95 which controls the flow of fluid through a bore 88 which communicates at its lower end with a passage 87. As shown in FIG. 10, the passage 87 communicates with a vertical bore 86. As shown in FIG. 3, the vertical bore 86 communicates with the upper interior passageway 26. As shown in FIG. 6, the bore 88 communicates at its upper end with a bore 90 which in turn communicates with a lateral passage 91. As shown in FIG. 8, the lateral passage 91 communicates with the longitudinally extended passage 92 which communicates with the passage 21 and the upstream port 20.

The cup-shaped valve body 95 is made from any suitable elastomeric material and it is provided with a cup-shaped liner 99 (FIG. 6) which is seated in the bore 98 in the valve body 95. The cup-shaped liner 99 may be made from any suitable material, as for example, stainless steel. A suitable spring 100 has its lower end mounted within the cup-shaped liner 99 and against the closed end thereof. The upper end of spring 100 is extended upwardly and seated against the lowermost one of a pair of shoulders 102 on the lower end of a valve stem 106. The upper end of the spring 100 is also seated around a reduced diameter lower end portion 101 of the valve stem 106. The valve stem 106 is threaded and it is mounted in a threaded bore 107 formed in the top end cover 12. The threaded bore 107 communicates with an enlarged bore 105 which is in alignment with the bore 90 in the valve body 11. The pair of integral spaced apart shoulders 102 on the valve stem 106 form a groove 103 in which is operatively mounted a suitable O-ring seal 104. The valve stem 106 is adapted to be adjusted to a desired position to exert a closing pressure on the spring 100, and to be locked in place by a suitable jam nut 108. The outer end of the valve stem 106 is provided with a slot 109 for adjustment purposes. As shown in FIG. 6, the closed end of the valve element 95 is provided with a conical nose 96 which is adapted to be seated on the valve seat or orifice 97 formed at the upper end of the bore 88.

It will be seen that the pre-exhaust valve 85 controls the return flow of fluid between the ports 27 and 20 through a parallel passage formed by the upper interior passageway 26, passageway 87, bores 86 and 88, passageways 91 and 92 and passageway 21. The valve stem 106 may be adjusted to provide a desired spring closing pressure on the cup-shaped valve 95 to control the flow of fluid through the second or parallel return passage for quickly exhausting or dumping a volume of returning fluid from the downstream port 27 and through the valve 10 and out the upstream port 20.

Figure 7:
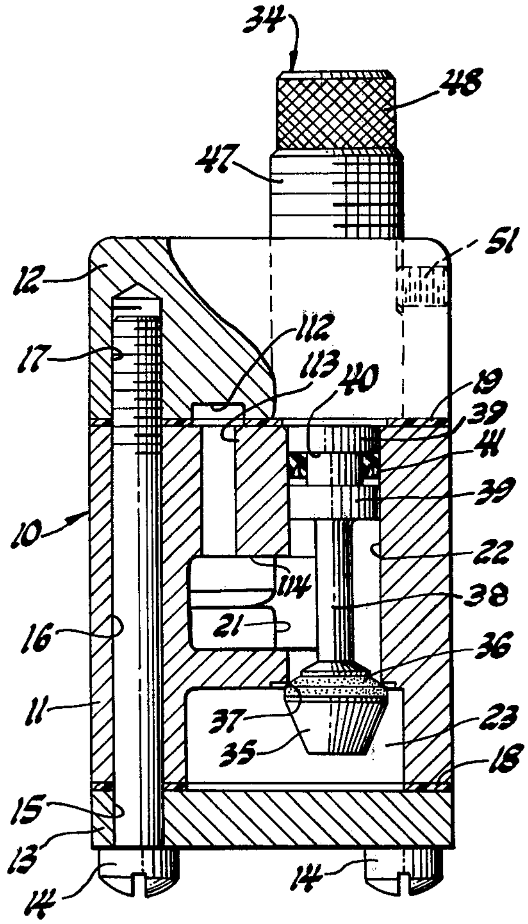
FIG. 7 is a vertical section view of the valve structure illustrated in FIG. 3, taken along the line 7—7 thereof, and looking in the direction of the arrows.
Figure 9:
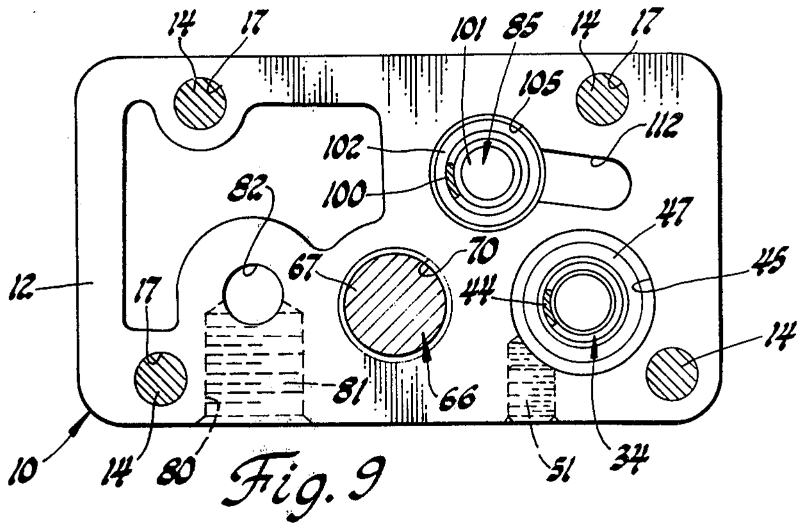
FIG. 9 is a horizontal section view of the valve structure illustrated in FIG. 2, taken along the line 9—9 thereof, and looking in the direction of the arrows.

The pre-exhaust valve means 85 is provided with a vent means to insure that it operates in a quick and efficient manner. As shown in FIG. 9, a lateral vent passage 112 is formed in the lower surface of the top end cover 12, and it communicates with the upper end of the bore 90 in which the pre-exhaust valve 95 is operatively mounted. As shown in FIG. 7, the lateral vent passage 112 communicates with the upper end of a vertical passage 113 which communicates at its lower end with a passage 114. The passage 114 communicates with the upper interior passageway 21 and the upstream port 20. The importance of the last described vent passage means for the pre-exhaust valve means 85 will be best understood from the following discussion. The clearance between the pre-exhaust valve 95 and rhe bore 90 varies within certain manufacturing tolerances for proper operation of the valve 95. For example, said clearance may vary from a maximum of 0.006" to a minimum of 0.002". In use, there is a certain amount of fluid leakage around the valve element 95 into the bore 90 which could cause the pre-exhaust valve 85 to act slowly because of the back pressure created by said leakage. Accordingly, the vent passages 112 and 113 are made to a cross section size to convey a flow of fluid larger in volume than any flow that may slip by the valve element 95, in order to insure quick and efficient opening of the pre-exhaust valve, when required. For example, in one embodiment, the total maximum clearance between the valve 95 and the bore 90 was 0.0037 square inches, and the cross section area of each of the vent passages 112 and 113 was at least 0.0191 square inches.

In use, for a meter in operation for controlling the operation of a fluid operated apparatus in one direction, the valve 10 receives fluid under pressure at the upstream or supply port 20 (FIG. 2) from whence it passes into the upper interior passageway 21 and thence down through the bore 22 past the regulating valve element 35, and into the lower interior passageway 23. The fluid then flows up through the bore 30 and around the flow control valve 67 into the passageway 25, and thence into the upper interior passageway 26 and out the downstream port 27. The fluid flow control valve 67 provides a meter in action on the fluid flowing therearound in accordance with its adjusted position relative to the valve seat 69. The check valve 53 is in the closed position in FIG. 2.

It will be seen, that as the fluid pressure builds up on the downstream side of the regulating poppet valve element 35, that the pressure will tend to move the poppet valve element 35 upwardly against the pressure of spring 44 to a closed position. For controlling the operation of said fluid operating apparatus in the other direction, the fluid is exhausted with a free flow action by the valve 10. The fluid exhausted from said fluid operated apparatus enters the downstream port 27 and flows into the second upper interior passageway 26 and into the passageway 25, and thence downwardly through the bore 24 against the check valve means 53. The exhausted fluid pressure opens the check valve means 53 and allows a free flow of fluid through the bore 24 downwardly into the lower interior chamber 23, from whence it passes upwardly past the regulator valve element 35 into the bore 22, and thence into the first upper interior passageway 21 and out the upstream port 20.

Figure 11:
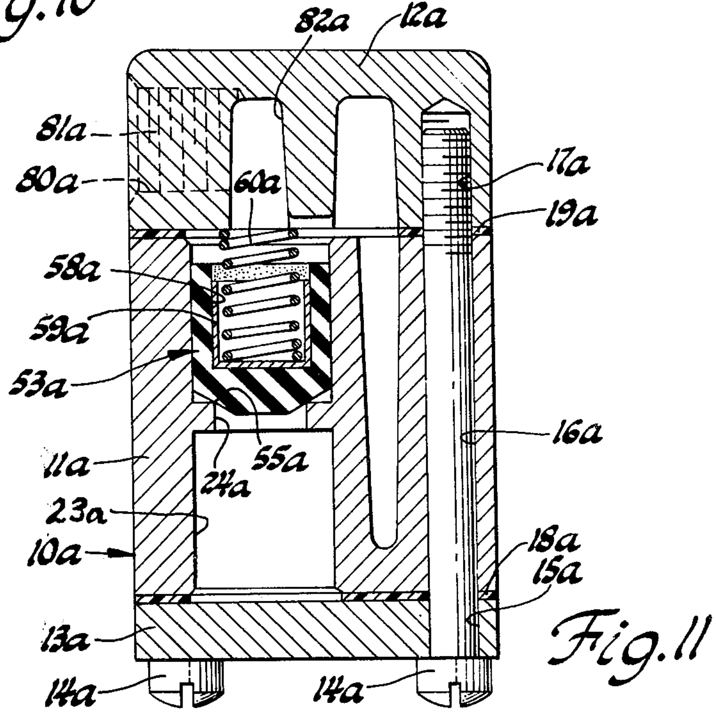
FIG. 11 is a vertical section view, similar to FIG. 4, of a modified valve structure.

FIG. 11 illustrates a second embodiment of the invention, generally indicated by the numeral **10*a*, which is arranged to provide a meter out action on fluid flowing through the first passageway means between the downstream port 27 and the upstream port 20. The parts of the embodiment illustrated in FIG. 11 which are the same as the first described embodiment of FIGS. 1 through 10 have been marked with the same reference numerals followed by the small letter "a". The valve embodiment of FIG. 11 would include the same valve structure as that shown in FIGS. 1 through 10, with the exception that the check valve 53*a* is inverted so as to provide a free flow path from the lower interior passageway 23*a* when fluid is flowing from a supply port 20*a* through the valve 10*a* and out a downstream port 27*a*. It will thus be seen, that a free flow of fluid will be provided for fluid passing through the valve 10*a* when the fluid is admitted into the valve 10*a*, and that a meter out action on the fluid may be provided when it is returned through the valve 10*a* to the upstream port 20*a***.

The pre-exhaust valve means 85 functions at the start of a meter out operation. For example, if a double acting air cylinder is being controlled by the valve **10*a* on the head end, and a pressure regulator and flow control valve on the rod end, and the pressure at the head end of the cylinder is 100 psi, and the pressure at the rod end is regulated to a level sufficient to return the cylinder to its initial position, as for example 30 psi, and the speed of the return stroke is to be controlled by exhausting the air from the head end of the cylinder thru the adjustable flow control valve 66**, the following conditions exist.

The air exhausting from the head end of the cylinder through the flow control valve 66 could take a substantial period of time to reduce the 100 psi head end pressure to a level low enough to permit the 30 psi reduced pressure on the rod end to return the cylinder to its initial position.

The purpose of the adjustable pre-exhaust valve means 85 is to provide a means for reducing the 100 psi head end pressure quickly through a parallel flow path to a level at which the 30 psi reduced rod end pressure will start the return stroke, and then close, forcing the exhausting air through the orifice of the adjustable flow control valve 66, thus controlling the return speed of the cylinder.

It should be noted that the pre-exhaust valve means 85 is adjustable and may be set to minimize the delay prior to controlling flow, as described above, or set to provide a predetermined delay prior to controlling flow, or set to quick exhaust only with no flow control.

It should also be noted that although the most common application would probably be with a cylinder as previously described, this embodiment can be used on either end of a cylinder, as well as other types of cylinders, such as single acting, or double rod, or diaphragm operated, or other similar devices.

The pre-exhaust valve means 85 may also be used to provide a time delay function in the control sequence for the aforementioned exemplary cylinder control system. Instead of bringing the 100 psi pressure at the head end of the cylinder directly down to a level low enough to permit the 30 psi pressure on the rod end to return the cylinder to its initial position, the pre-exhaust valve means 85 could be set to quickly open and reduce the 100 psi in the cylinder head end to a pressure above 30 psi on the rod end, as for example 50 psi. The pre-exhaust valve means 85 would then close, and the pressure in the cylinder head end would then bleed off through the flow control for a time interval, as for example, 10 seconds, after which the cylinder would then start its controlled return. It will be seen from the foregoing, that the pre-exhaust valve means 85 can be used as a time delay valve.

The vent passage means 112, 113 and 114 function to remove any back pressure on the pre-exhaust valve means 85 which may make it operate slower than required for an efficient meter out operation.

While it will be apparent that the preferred embodiments of the invention herein disclosed are well calculated to fuldill the objects above stated, it will be appreciated that the invention is susceptible to modification, variation and change.

We claim:

1. In a combination pressure regulating and flow control valve for controlling fluid flow through a fluid flow circuit, the combination comprising:

(a) a valve body and cover means having an upstream port for connection to a source of pressurized fluid, and a downstream port for connection to a fluid controlled apparatus in said fluid flow circuit, and a first fluid flow passage interconnecting said ports;

(b) an adjustable pressure regulator valve means operatively mounted in said first fluid flow passage to provide a reduced downstream pressure at the downstream pressure port when fluid is flowing through said first fluid flow passage from the upstream port to the downstream port, and to maintain said reduced downstream pressure at a fixed differential relative to the pressure at the upstream port;

(c) an adjustable fluid flow control valve means operatively mounted in said first fluid flow passage to provide a meter in control operation on the flow of fluid flowing through said first fluid flow passage in one direction, and a meter out control operation on the flow of fluid flowing through said first fluid flow passage in the opposite direction;

(d) a check valve means operatively mounted in said first fluid flow passage in parallel with said adjustable fluid flow control valve means to provide a free flow of fluid flowing through said first fluid flow passage in a direction opposite to the direction of metering control;

(e) an adjustable quick exhaust valve means operatively mounted in a second fluid flow passage that is parallel to said first fluid flow passage and which interconnects said ports, and having a valve element movably mounted in a bore communicating with said second fluid flow passage, and said valve element having a back end and a front valve end, and said quick exhaust valve means bypassing the pressure regulator valve means, the check valve means, and fluid flow control valve means, for selective fast exhausting of fluid volume from said downstream pressure port through said second fluid flow passage and out said upstream pressure port for a time interval prior to a meter out control operation;

(f) a vent passage means connected to said upstream port for venting the valve element bore behind the valve element of the quick exhaust valve means.

2. A combination pressure regulating and flow control valve structure as defined in claim 1, wherein:

(a) said adjustable fluid flow control valve means and check valve means are operatively mounted in said first fluid flow passage to provide a meter in action when fluid is flowing through said first fluid flow passage from said upstream port to said downstream port, and to provide a free flow of fluid when fluid is exhausted from said downstream port, and through said first fluid flow passage, and out the upstream port.

3. A combination pressure regulating and flow control valve structure as defined in claim 1, wherein:

(a) said adjustable fluid flow control valve means and check valve means are operatively mounted in said first fluid flow passage to provide a free flow of the fluid when fluid is flowing through said first fluid flow passage from said upstream port to said downstream port, and to provide a meter out action when fluid is exhausted from said downstream port through said fluid flow passage and out the upstream port.

4. A combination pressure regulating and flow control valve as defined in claim 1, wherein:

(a) said check valve means comprises a spring biased reversible valve means.

5. A combination pressure regulating and flow control valve as defined in claim 1, wherein said adjustable pressure regulator valve means includes:

(a) an inlet seat in said first fluid flow passage;

(b) a valve element movably supported in said first fluid flow passage for operative engagement with said valve seat; and, (c) an adjustable spring means operatively engaged with said valve element for normally biasing the valve element to an open position spaced from said inlet seat.

6. A combination pressure regulating and flow control valve as defined in claim 5, wherein said adjustable pressure regulator valve means includes:

(a) a pressure balancing seal means opposed to said valve element, and sealing an area equal to the area of said valve seat engaged by the valve element.

7. A combination pressure regulating and flow control valve as defined in claim 6, wherein:

(a) said valve element is a conically shaped poppet valve.

8. A combination pressure regulating and flow control valve as defined in claim 1, wherein:

(a) the cross section area of said vent passage means is greater than the total clearance area between the valve element of the quick exhaust valve means and its valve bore.

* * * * *